June 13, 1933. G. H. WATZKE ET AL 1,914,057
DRY CELL AND MANUFACTURE THEREOF
Filed March 1, 1930
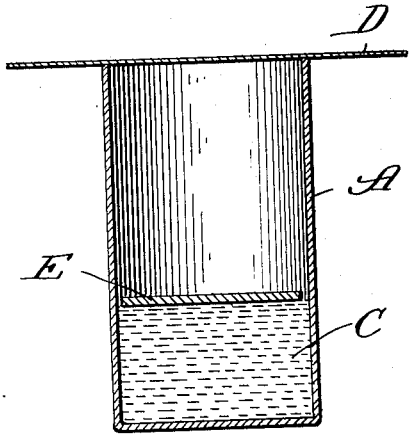
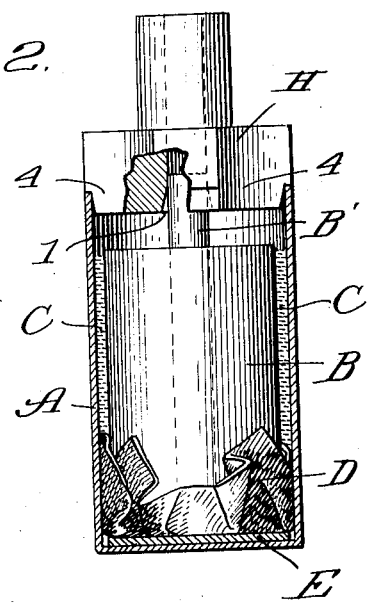
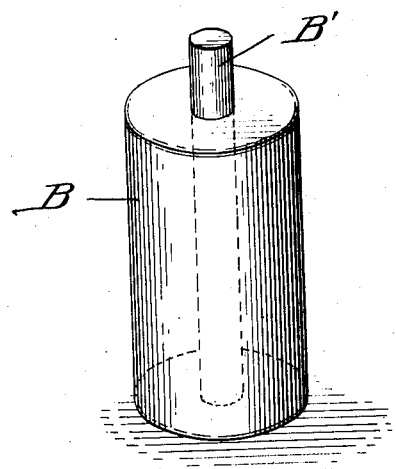
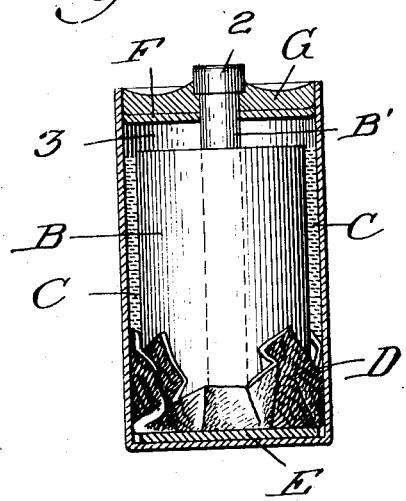
Inventors:
Gustav H. Watzke,
Leroy G. Berigan,
By Dyrenforth, Lee, Chritton & Wiles,
Attys.

Patented June 13, 1933

1,914,057

UNITED STATES PATENT OFFICE

GUSTAV H. WATZKE AND LEROY G. BERIGAN, OF MADISON, WISCONSIN, ASSIGNORS TO FRENCH BATTERY COMPANY, OF MADISON, WISCONSIN, A CORPORATION OF WISCONSIN

DRY CELL AND MANUFACTURE THEREOF

Application filed March 1, 1930. Serial No. 432,416.

This invention relates particularly to a dry-cell and manufacture thereof.

The primary object is to provide a simple and practical method, adaptable to large scale factory production, for producing an improved cell at a minimum cost.

The invention is illustrated in the accompanying drawing, in which—

Fig. 1 is a vertical sectional view illustrating a step in the manufacture of the cell; Fig. 2, a similar sectional view, illustrating a further step; Fig. 3, a perspective view of a depolarizing core employed, and Fig. 4, a sectional view of the finished dry-cell.

In the illustration given, A designates the zinc cup of a cell; B, a core composed of a suitable depolarizing mix, the core being provided with a central carbon B'; C an electrolyte interposed between the core and the inner wall of the zinc can; D, a ply of limp fabric, such as cheese cloth or very thin, inert paper; E, an insulating disk interposed between the bottom of the core and the bottom of the can; F, a washer disposed a short distance above the upper end of the body of the core; and G, a seal, such as a body of sealing wax, closing the upper end of the cell.

The body of depolarizing material may be molded from any suitable depolarizing mixture, such mixtures being well known in the art. The carbon pencil B' preferably extends to the lower end of the core.

The preferred method of manufacture is as follows:

A sufficient quantity of electrolyte is poured into the cup A; the disk E is then introduced so as to rest upon the electrolyte; a small square of thin, limp fabric, such as a very thin cheese cloth, is then placed on the upper end of a can; the core is then lowered into the can, the fabric D crumpling readily in this operation and enveloping the lower end of the core and forming folds or wrinkles in the fabric at the sides of the core, thus centering the core and causing the electrolyte to well upwardly at the sides of the core; a temporary centering device H is then applied to the upper end of the can, this device being provided with a central bore 1 which receives the upper end of the carbon pencil B'; the assembly is then introduced into hot water which has the effect of gelatinizing the electrolyte; the cell is then introduced into a suitable machine which introduces the disk or washer F, and applies the brass cap 2 to the carbon; and finally the molten sealing material G is introduced above the washer as a final step in finishing the cell.

Any suitable electrolyte may be employed. Ordinarily, an electrolyte containing starch, water, and one or more salts is employed, an electrolyte being capable of becoming gelatinous under the action of heat. In practice, the assembly shown in Fig. 2 may be placed upon a moving belt which travels through heated water to effect the setting of the electrolyte.

The spacing disk E may be dipped in paraffin or other insulating material, if desired. The same is true of the washer F.

The piece of bibulous material D, as stated, may consist either of a very light cheese cloth, or of a thin fold-forming paper. The ply should possess sufficient flexibility and limpness, or inertness, to enable the folds to form readily at the sides of the core as the core is lowered into the cup. The stiffness of the fabric, therefore, is practically negligible. It need be only sufficient to maintain itself in position on the upper end of the can until the core is lowered into the can.

If desired, that portion of the fabric which underlies the bottom of the core may be covered with a film of paraffin or other impervious material, in which case the disk E may be omitted.

By employing a depolarizing mix of suitable consistency, it is possible to produce a molded core having fairly smooth surfaces. Such cores are necessarily rather fragile when freshly formed; hence, where it is desired to construct a cell employing an unwrapped or naked core, it is necessary that the process be of a character to permit the assembly to be effected without injury to the core and in such manner as to insure the cell against migration of particles of the depolarizing mix which may become accidentally loosened from the core. In accordance with the present process, should any particles be dislodged from the surface of the core, they will be caught by the upturned folds of the fabric, which rather closely embrace the lower portions of the core.

The present method enables very high grade dry-cells having unwrapped cores to be manufactured safely on a large scale production basis.

In Fig. 4, 3 designates an air space between the core and washer.

Referring to Fig. 2, the member H is shown provided with passages 4 adapted to permit the escape of gases during the cooking operation.

While it is preferred to introduce the electrolyte in the manner shown in Fig. 1, it is possible to first produce an assembly such as is shown in Fig. 2, omitting the electrolyte, and then pour the electrolyte into the can.

No unnecessary limitation is to be understood from the foregoing detailed description, it being the intent to claim the invention as broadly as is permissible, in view of the prior art.

What we regard as new, and desire to secure by Letters Patent, is:

1. The method of manufacturing a dry cell, which comprises: placing a separate ply of thin limp fabric upon the open end of an electrode cup, bringing a naked depolarizing core into engagement with said fabric and inserting the two into the cup, said core serving as a means of depressing the fabric into the cup and forming folds at the sides of the lower end-portion of the core.

2. The method of manufacturing a dry cell, which comprises: introducing into an electrode cup a quantity of electrolyte and a spacing disk, placing upon the upper end of the cup a separate ply of thin, limp fabric, bringing a naked depolarizing core into engagement with the fabric and lowering the two into said cup, thereby causing the fabric to form folds at the sides of the lower portion of the core, and causing the electrolyte to well upwardly into the space between the core and cup.

GUSTAV H. WATZKE.
LEROY G. BERIGAN.